United States Patent
Lecue et al.

(10) Patent No.: US 10,311,404 B1
(45) Date of Patent: Jun. 4, 2019

(54) SOFTWARE PRODUCT DEVELOPMENT DEFECT AND ISSUE PREDICTION AND DIAGNOSIS

(71) Applicant: ACCENTURE GLOBAL SOLUTIONS LIMITED, Dublin (IE)

(72) Inventors: Freddy Lecue, Dublin (IE); Chahrazed Bouhini, Dublin (IE); Benedikt M. Golla, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/863,743

(22) Filed: Jan. 5, 2018

(51) Int. Cl.
- G06F 9/44 (2018.01)
- G06Q 10/10 (2012.01)
- G06N 3/04 (2006.01)
- G06Q 10/06 (2012.01)

(52) U.S. Cl.
CPC ............ G06Q 10/101 (2013.01); G06N 3/04 (2013.01); G06Q 10/063112 (2013.01); G06Q 10/063114 (2013.01)

(58) Field of Classification Search
CPC ......... G06Q 10/101; G06Q 10/063114; G06Q 10/063112; G06N 3/04
USPC ................................. 717/101–102, 124–131
See application file for complete search history.

(56) References Cited

U.S. PATENT DOCUMENTS

| | | | | |
|---|---|---|---|---|
| 8,157,730 B2 * | 4/2012 | LeBoeuf | ................. | G06F 19/00 600/300 |
| 8,903,593 B1 * | 12/2014 | Addepalli | ............. | H04W 4/046 701/29.1 |
| 8,924,942 B1 * | 12/2014 | Makuch | ................... | G06F 9/44 715/762 |
| 9,053,435 B2 * | 6/2015 | Krukow | ............... | G06N 99/005 |

(Continued)

FOREIGN PATENT DOCUMENTS

| EP | 1085416 | 3/2001 |
|---|---|---|
| EP | 2850865 A1 | 3/2015 |
| WO | 2015/123474 | 8/2015 |

OTHER PUBLICATIONS

Clark et al., "How Good Is the Software: A Review of Defect Prediction Techniques", 2001, Carnegie Mellon University, 35 pages. (Year: 2001).*

(Continued)

*Primary Examiner* — Ted T. Vo
(74) *Attorney, Agent, or Firm* — Mannava & Kang, P.C.

(57) ABSTRACT

According to an example, with respect to software product development defect and issue prediction and diagnosis, worker profile information and worker state information for a plurality of workers involved in development of a product may be ascertained. A general worker signature that includes a plurality of clusters for all of the plurality of workers may be generated. For each of the plurality of workers, an individual worker signature vector that represents at least one cluster of the plurality of clusters that an individual worker is aligned to may be generated. A product signature (Continued)

vector may be generated based on product state information. Further, an output that includes an explanation for a defect associated with the development of the product may be generated based on a neural network model based analysis of the individual worker signature vectors and the product signature vector over a temporal dimension.

20 Claims, 16 Drawing Sheets

(56) References Cited

U.S. PATENT DOCUMENTS

2005/0159787 A1* 7/2005 Linberg ............... A61B 5/0031
607/31

OTHER PUBLICATIONS

Shukla et al., "A Review on Software Defect Prediction", Dec. 2015, International Journal of Advanced Research in Computer Engineering & Technology, vol. 4, Issue 12, pp. 4387-4394. (Year: 2015).*

* cited by examiner

| | STATIC | DYNAMIC |
|---|---|---|
| W₁ | ROLE: JAVA DEVELOP SPECIALIST<br>SKILLS: JAVA, JENKINS, PYTHON<br>STRENGTH: LEARNER | PRIOR PIECE OF SOFTWARE WORKED IN PAST:<br>- WORKFORCE PLUG-IN: WP<br>- AIR FLIGHT PREDICTION: AP<br><br>CONTENT WORKED<br>- WP1.1, AP.2.1 |
| W₂ | ROLE: DEVELOPER<br>SKILL: C++, TENSORFLOW<br>STRENGTH: LEARNER | PRIOR PIECE OF SOFTWARE WORKED IN PAST:<br>- WP, AP, XP<br><br>CONTENT WORKED<br>- WP1.1, AP.2.1 |
| W₃ | ROLE: MANAGER<br>SKILLS: MICROSOFT SKILLS<br>STRENGTH: COMPETITOR | PRIOR PIECE OF SOFTWARE WORKED IN PAST:<br>- AP, XP, TP<br><br>CONTENT WORKED<br>- AP2.2, XP1.1, TP.3.1 |

(1) WORKER PROFILES
INPUT: (E.G., ROLE, LEVEL, SKILLS,....)

ASCERTAIN WORKER PROFILE INFORMATION THAT INCLUDES ROLES OF A PLURALITY OF WORKERS INVOLVED IN DEVELOPMENT OF A PRODUCT
1202

IMPLEMENT AT LEAST ONE SENSOR TO MONITOR PHYSIOLOGY OF THE PLURALITY OF WORKERS
1204

ASCERTAIN, FROM THE AT LEAST ONE SENSOR, WORKER STATE INFORMATION OF THE PHYSIOLOGY OF THE PLURALITY OF WORKERS WITH RESPECT TO THE DEVELOPMENT OF THE PRODUCT
1206

GENERATE, BASED ON THE WORKER PROFILE INFORMATION AND THE WORKER STATE INFORMATION, A GENERAL WORKER SIGNATURE THAT INCLUDES A PLURALITY OF CLUSTERS FOR ALL OF THE PLURALITY OF WORKERS
1208

FOR EACH OF THE PLURALITY OF WORKERS, GENERATE, BASED ON WORKER PROFILE INFORMATION FOR AN INDIVIDUAL WORKER, WORKER STATE INFORMATION FOR THE INDIVIDUAL WORKER, AND THE GENERAL WORKER SIGNATURE, AN INDIVIDUAL WORKER SIGNATURE VECTOR THAT REPRESENTS AT LEAST ONE CLUSTER OF THE PLURALITY OF CLUSTERS THAT THE INDIVIDUAL WORKER IS ALIGNED TO
1210

ASCERTAIN PRODUCT STATE INFORMATION ON A STATUS OF TEMPORAL DEVELOPMENT FOR THE PRODUCT
1212

SOFTWARE PRODUCT DEVELOPMENT DEFECT AND ISSUE PREDICTION AND DIAGNOSIS

BACKGROUND

Development of software products commonly proceeds in phases or iterations. Each phase or iteration may require different types of changes to be made to the product, may involve different personnel assigned to different activities, and may be characterized by different context conditions. The personnel involved in the development may be characterized by different levels of expertise and prior experience, but may also differ in terms of physiological and psychological preferences and sensitivities. Context conditions may influence the physiological and psychological states and behaviors of the personnel in accordance with their individual preferences and sensitivities. As a result, enduring characteristics of the individual worker, the changing state and actions of the worker, and the characteristics of the product changes that are carried out, together influence the expected product and project outcomes of a development phase or iteration as well as of the product and project lifecycle.

BRIEF DESCRIPTION OF DRAWINGS

Features of the present disclosure are illustrated by way of examples shown in the following figures. In the following figures, like numerals indicate like elements, in which

FIG. 3 illustrates worker profile information for general worker signature determination and individual worker signature vector determination to illustrate operation of the software product development defect and issue prediction and diagnosis system of FIG. 1, according to an example of the present disclosure;

DETAILED DESCRIPTION

Figure 1:
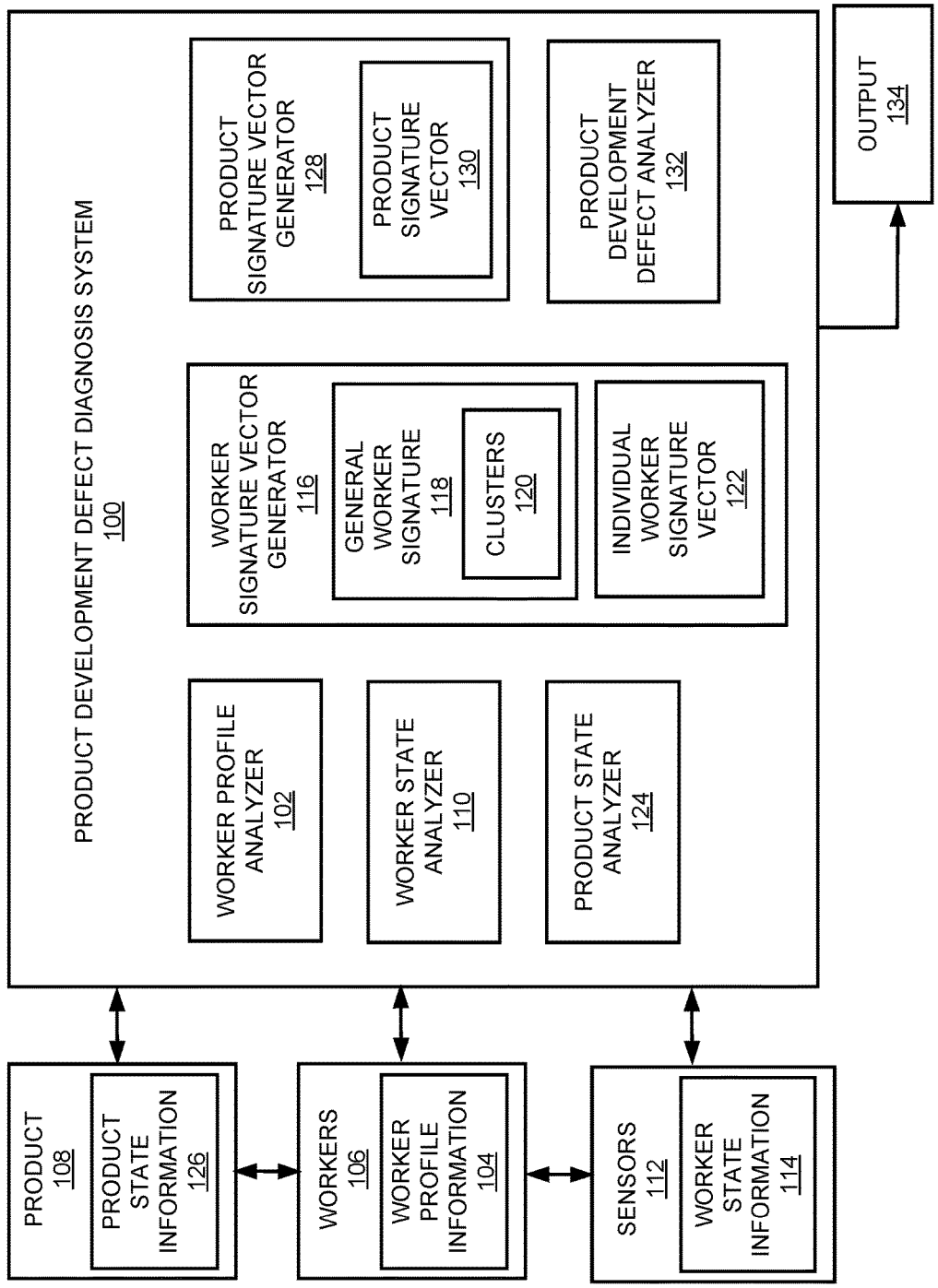
FIG. 1 illustrates an architecture of a software product development defect and issue prediction and diagnosis system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A software product development defect and issue prediction and diagnosis system, a method for software product development defect and issue prediction and diagnosis, and a non-transitory computer readable medium having stored thereon machine readable instructions for software product development defect and issue prediction and diagnosis are disclosed herein. The system, method, and non-transitory computer readable medium disclosed herein provide for the identification of defects during product development by reasoning on quantitative and qualitative information captured from human activities during product development, and re-factoring the captured information to diagnose defects during the product development process.

With respect to product development, for a product that includes a software application and other such products, development of such products may include frequent product iterations with relatively small changes. Upon completion of an iteration, product and project issues or defects may be identified. For example, product defects may include, software bugs, compilation problems, integration issues, etc. Product defects may be identified, for example, by automated testing, user feedback, and/or based on inspection of the software code.

Each of these techniques for defect identification may be subject to errors, may fail to detect complex issues involving multiple components or units, and may be difficult to apply predictively. Thus, it is technically and conceptually challenging to efficiently and objectively identify or anticipate product defects and project issues with respect to software applications during development. Furthermore, while various techniques may be used to track the root causes of software defects, causes that are not technical or not related to specific identifiable changes to the software product are difficult to identify and understand. In particular, it is technically challenging to ascertain the human impact and/or role of human states and behaviors with respect to such defects.

In order to address at least the aforementioned technical challenges with respect to defect diagnosis for products, such as software applications, the system, method, and non-transitory computer readable medium disclosed herein provide for the diagnosing of software development defects by reasoning on quantitative and qualitative information captured from multimodal human activities, and re-factorization of such information in the software development environment. In this regard, the system, method, and non-transitory computer readable medium disclosed herein may receive, as input, worker profile information, worker state information, and product state information. The worker profile information may include human, developer, and other attributes (e.g., tenure with a company, skills, age, location, etc.). The worker state information may be ascertained from a set of hardware devices that monitor and capture human behavior and physiological state in real-time or in aggregation during a software development iteration phase. Examples of the hardware devices may include wearable and stationary devices for capturing worker presence as well as physiological and physio-psychological parameters such as heartrate, body movement, eye movement, environmental and body temperatures, and further allowing the deduction of mental and psychological states such as focus, anxiety, etc. The product state information may include a temporal evolution of the software code, the corresponding temporal evolution of the presence of issues or defects, and evolution of additional information which may inferentially suggest that issues are present (e.g., topic-clustered communication). In this regard, tracking tools such as CONFLUENCE for general documentation, GIT for code evolution, JIRA for activity/work progress (positive or negative), JENKINS issue tracker for software defects, etc., may be utilized.

The system, method, and non-transitory computer readable medium disclosed herein may diagnose the defects associated with a product, and provide an output that includes an explanation that addresses human characteristics or practices during development of the product. For example, the explanation may identify junior workers with less focus during the final delivery phase of a product that resulted in a defect associated with the product.

The system, method, and non-transitory computer readable medium disclosed herein may provide for technical benefits such as objective determination of defects associated with a product to identify human practices during development of the product that resulted in the defects. The system, method, and non-transitory computer readable medium disclosed herein may thus reduce and/or eliminate unnecessary utilization of computing resources due to an erroneous development of a product, and/or future development of the product, that may affect the performance, reliability, and maintainability of the product.

In some examples, elements of the software product development defect and issue prediction and diagnosis system may be machine readable instructions stored on a non-transitory computer readable medium. In this regard, the software product development defect and issue prediction and diagnosis system may include or be a non-transitory computer readable medium. In some examples, the elements of the software product development defect and issue prediction and diagnosis system may be hardware or a combination of machine readable instructions and hardware.

FIG. 1 illustrates an architecture of a software product development defect and issue prediction and diagnosis system 100 (hereinafter "system 100"), according to an example of the present disclosure.

Referring to FIG. 1, the system 100 may include a worker profile analyzer 102 that is executed by at least one hardware processor (e.g., the hardware processor 1102 of FIG. 11, and/or the hardware processor 1304 of FIG. 13) to ascertain worker profile information 104 that includes roles of a plurality of workers 106 involved in development of a product 108. According to examples, the product 108 may include a software application, or another such product. According to examples, the worker profile information 104 may include static information that includes, for example, the roles of the plurality of workers 106 in association with the development of the software application, skill levels of the plurality of workers 106 with respect to languages usable for the development of the software application, and strength levels of the plurality of workers 106 in association with the development of the software application. Further, the worker profile information 104 may include dynamic information that includes prior software applications utilized by the plurality of workers 106.

A worker state analyzer 110 that is executed by the at least one hardware processor (e.g., the hardware processor 1102 of FIG. 11, and/or the hardware processor 1304 of FIG. 13) may ascertain, from a plurality of sensors 112, worker state information 114 of physiology of the plurality of workers 106 with respect to the development of the product 108. According to examples, the plurality of sensors 112 may include an anxiety sensor to measure an anxiety level of each of the plurality of workers 106 during the development of the product 108, a tracking sensor to measure a focus level of each of the plurality of workers 106 during the development of the product 108, and/or a presence sensor to measure the presence or absence of the plurality of workers 106 during the development of the product 108.

A worker signature vector generator 116 that is executed by the at least one hardware processor (e.g., the hardware processor 1102 of FIG. 11, and/or the hardware processor 1304 of FIG. 13) may generate, based on the worker profile information 104 and the worker state information 114, a general worker signature 118 that includes a plurality of clusters 120 for all of the plurality of workers 106. According to examples, the worker signature vector generator 116 may analyze, based on the worker profile information 104 and the worker state information 114, characteristics of each of the plurality of workers 106, determine similarities between the analyzed characteristics, and cluster workers of the plurality of workers 106 based on the determined similarities between the analyzed characteristics to generate the plurality of clusters 120.

For each of the plurality of workers 106, the worker signature vector generator 116 may generate, based on worker profile information for an individual worker, worker state information for the individual worker, and the general worker signature 118, an individual worker signature vector 122 that represents at least one cluster of the plurality of clusters 120 that the individual worker is aligned to. According to examples, the worker signature vector generator 116 may filter the worker profile information for the individual worker and the worker state information for the individual worker, using the general worker signature 118, to identify the at least one cluster of the plurality of clusters 120 that the individual worker is aligned to.

A product state analyzer 124 that is executed by the at least one hardware processor (e.g., the hardware processor 1102 of FIG. 11, and/or the hardware processor 1304 of FIG. 13) may ascertain product state information 126 on a status of temporal development for the product 108. According to examples, the product state analyzer 124 may ascertain product state information on the status of temporal development for the product 108 by analyzing success and failure activities associated with the temporal development for the product 108 by the plurality of workers 106.

A product signature vector generator 128 that is executed by at least one hardware processor (e.g., the hardware processor 1102 of FIG. 11, and/or the hardware processor 1304 of FIG. 13) may generate, based on the product state information 126, a product signature vector 130 that represents changes in the product 108. According to examples, for the product 108 that includes a software application, the product signature vector generator 128 may analyze, based on character changes in code of the software application and a measure of uniqueness of a change in the code of the software application, the changes in the code of the software application, and utilize a neural network model to generate the product signature vector 130 that represents the changes in the software application.

A product development defect analyzer 132 that is executed by at least one hardware processor (e.g., the hardware processor 1102 of FIG. 11, and/or the hardware processor 1304 of FIG. 13) may generate, based on a neural network model based analysis of the individual worker signature vectors and the product signature vector 130 over a temporal dimension, an output 134 that includes an explanation for a defect associated with the development of the product 108. According to examples, the product development defect analyzer 132 may perform, for the neural network model based analysis, a separate and a combination analysis of factors derived from the general worker signature 118 to generate the output 134 that includes the explanation for the defect associated with the development of the product 108. In this regard, the product development defect analyzer 132 may determine, for the neural network model based analysis, a product state as a function of the product signature vector 130, the general worker signature 118, and a worker state, to generate the output 134 that includes the explanation for the defect associated with the development of the product 108.

Operation of the system 100 is described in further detail with reference to FIGS. 2-10.

Figure 2:
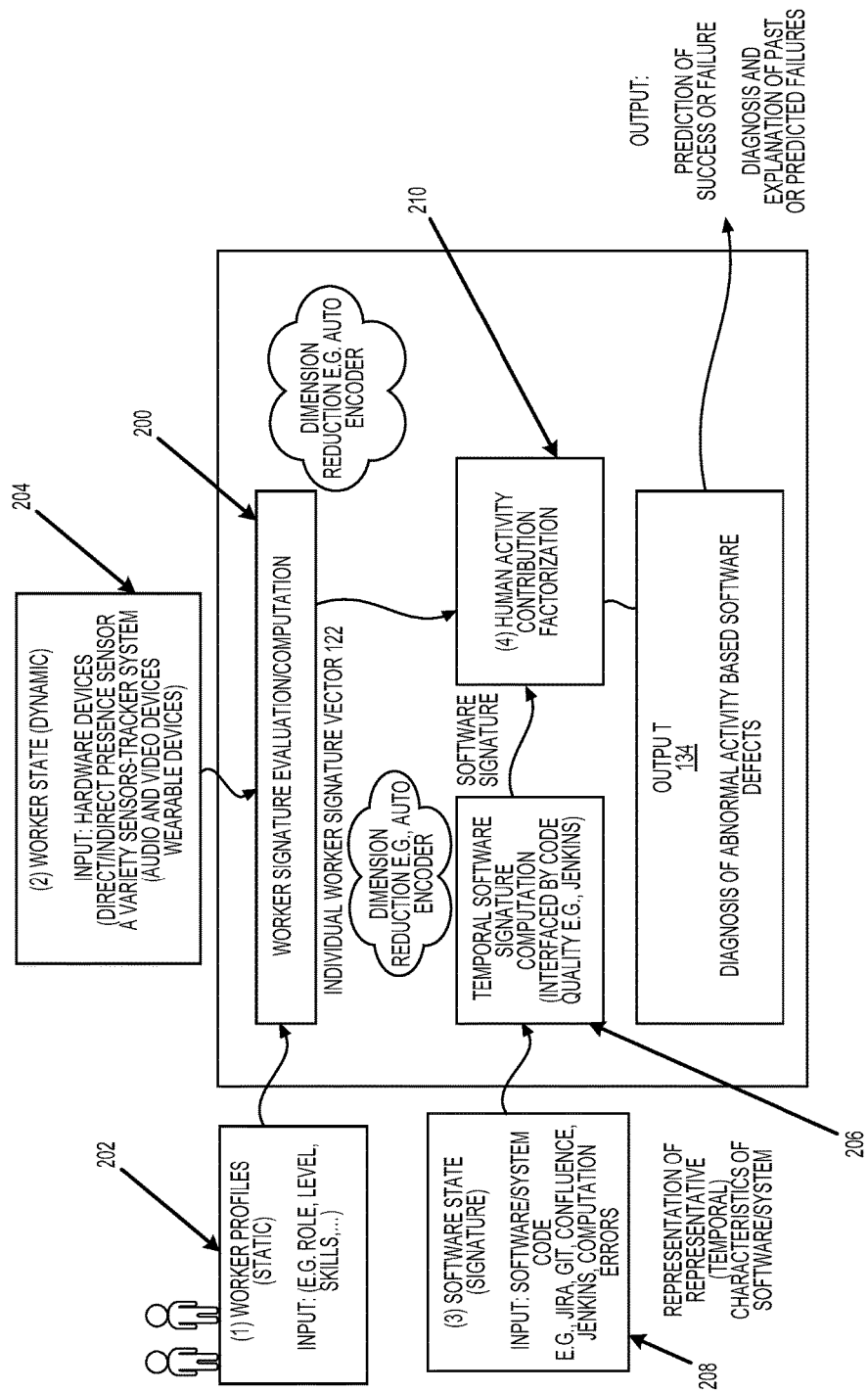
FIG. 2 illustrates further details of the architecture of the software product development defect and issue prediction and diagnosis system of FIG. 1, according to an example of the present disclosure.

FIG. 2 illustrates further details of the architecture of the system 100, according to an example of the present disclosure.

Referring to FIGS. 1 and 2, as disclosed herein, in order to generate the output 134 that includes an explanation for a defect associated with the development of the product 108, at 200, the worker signature vector generator 116 may generate, based on worker profile information for an individual worker, worker state information for the individual worker, and the general worker signature 118, the individual worker signature vector 122 that represents at least one cluster of the plurality of clusters 120 that the individual worker is aligned to. In this regard, the worker profile information 104 at 202 may include static information that includes, for example, the roles of the plurality of workers 106 in association with the development of the product 108, skill levels of the plurality of workers 106 with respect to languages usable for the development of the product 108, and strength levels of the plurality of workers 106 in association with the development of the product 108. Further, the worker state information 114 at 204 may include physiology of the plurality of workers 106 with respect to the development of the product 108. For example, the physiology of the plurality of workers 106 may be ascertained from the sensors 112 that include hardware devices such as direct/indirect presence sensors, sensor-tracker systems, audio and video devices, wearable devices, etc.

At 206, as disclosed herein, the product signature vector generator 128 may generate, based on the product state information 126 (e.g., the software application state information at 208), the product signature vector 130 that represents changes in the product 108. In this regard, for the product 108 that includes a software application, the changes may be ascertained from tools such JIRA, GIT, CONFLUENCE, JENKINS, and measurement of computation errors, etc.

At 210, as disclosed herein, the product development defect analyzer 132 may generate, based on a neural network model based analysis of the individual worker signature vectors and the product signature vector 130 over a temporal dimension, the output 134 that includes an explanation for a defect associated with the development of the product 108. In this regard, the product development defect analyzer 132 may perform human activity contribution factorization as disclosed in further detail with respect to FIG. 9. The output 134 may include, for example, a prediction of success or failure of the product 108, and/or a diagnosis and explanation of past or predicted failures for a defect associated with the development of the product 108.

FIG. 3 illustrates worker profile information for general worker signature determination and individual worker signature vector determination to illustrate operation of the system 100, according to an example of the present disclosure.

Referring to FIGS. 1 and 3, as disclosed herein, for the product 108 that includes a software application, the worker profile information 104 may include static information that includes, for example, the roles of the plurality of workers 106 in association with the development of the software application, skill levels of the plurality of workers 106 with respect to languages usable for the development of the software application, and strength levels of the plurality of workers 106 in association with the development of the software application. For example, for a worker $W_1$, the static information may include the role that includes "JAVA develop specialist", the skills may include "JAVA, JENKINS, PYTHON", and the strength may include "learner". Further, for the worker $W_1$, the dynamic information may include a "prior piece of software worked in past: WORKFORCE PLUG-IN: WP, AIR FLIGHT PREDICTION: AP, content worked WP1.1, AP.2.1", etc. For the example of FIG. 3, the static and dynamic worker profile information 104 may be similarly assigned to worker $W_2$ and worker $W_3$.

Figure 4:
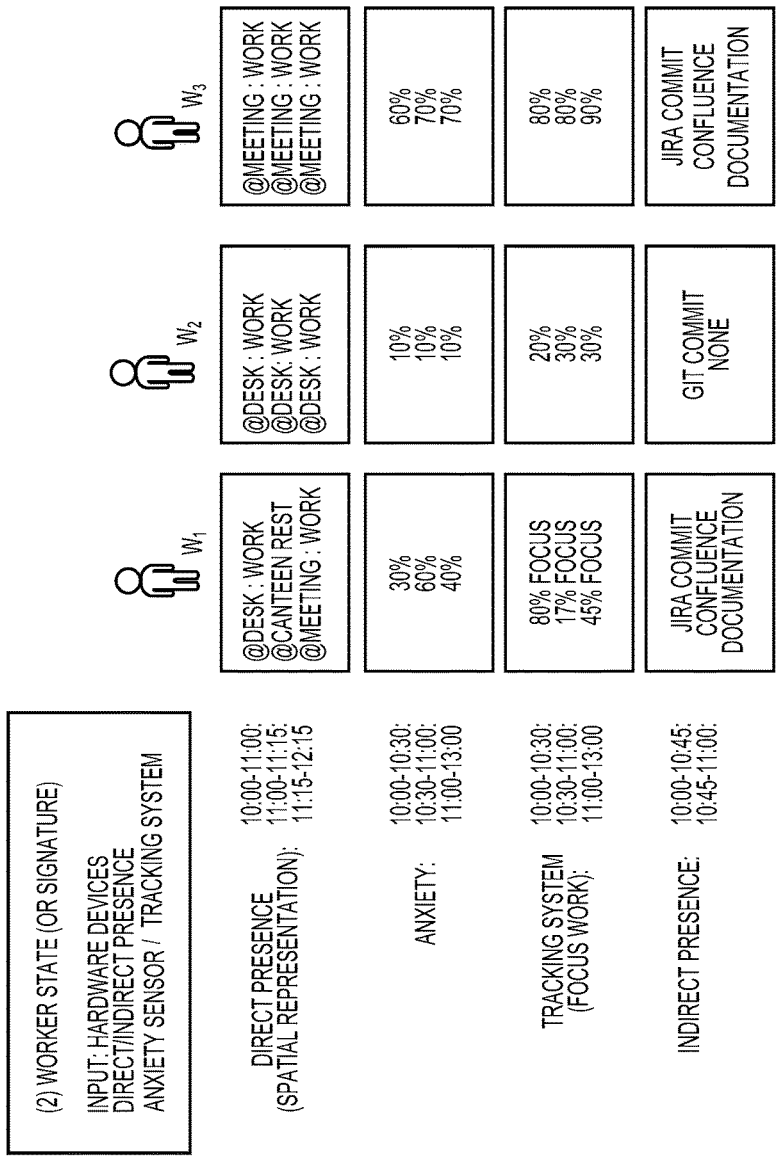
FIG. 4 illustrates worker state information for general worker signature determination and individual worker signature vector determination to illustrate operation of the software product development defect and issue prediction and diagnosis system of FIG. 1, according to an example of the present disclosure.

FIG. 4 illustrates worker state information for general worker signature determination and individual worker signature vector determination to illustrate operation of the system 100, according to an example of the present disclosure.

Referring to FIGS. 1 and 4, as disclosed herein, the worker state analyzer 110 may ascertain, from the plurality of sensors 112, worker state information 114 of physiology of the plurality of workers 106 with respect to the development of the product 108. According to examples, the plurality of sensors 112 may include a presence sensor to measure a working level (e.g., at desk and work from 10:00-11:00 am, at canteen and rest from 11:00-11:15 am, at meeting and work from 11:15-12:15 pm, etc., for worker $W_1$ for the example of FIG. 3) of each of the plurality of workers 106 during the development of the product 108, an anxiety sensor to measure an anxiety level (e.g., 30% anxiety from 10:00-10:30 am, 60% anxiety from 10:30-11:00 am, etc., for worker $W_1$) of each of the plurality of workers 106 during the development of the product 108, a tracking sensor to measure a focus level (e.g., 80% focus from 10:00-10:30 am, 17% focus from 10:30-11:00 am, etc., for worker $W_1$) of each of the plurality of workers 106 during the development of the product 108, and/or an indirect presence sensor to measure an indirect presence (e.g., JIRA commit from 10:00-10:45 am, CONFLUENCE from 10:45-11:00 am, etc., for worker $W_1$) of each of the plurality of workers 106 during the development of the product 108.

Figure 5:
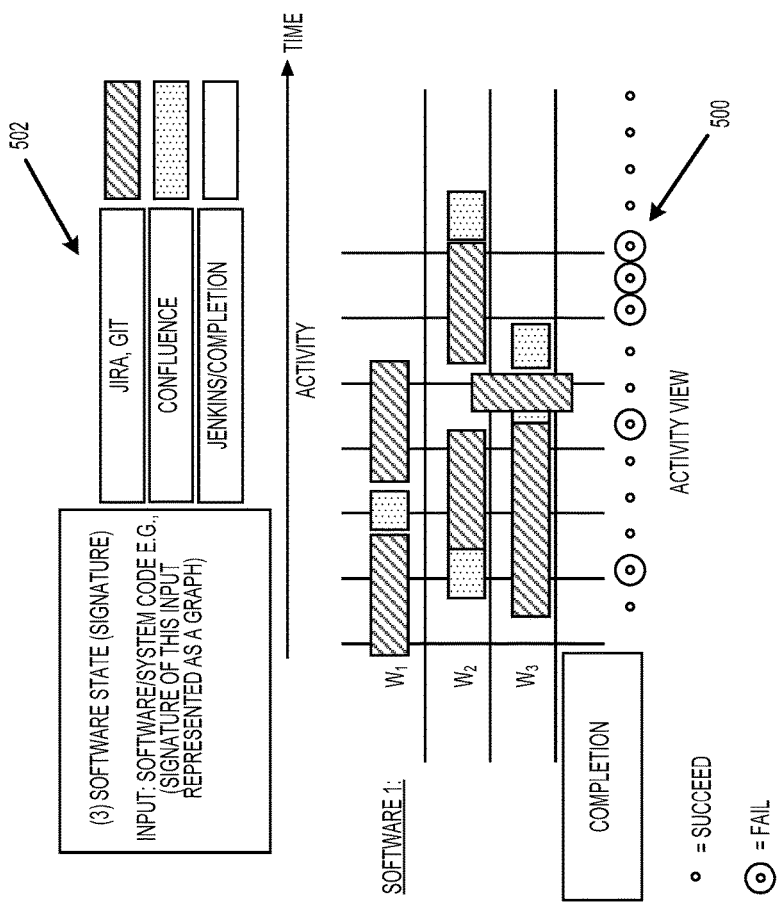
FIG. 5 illustrates product state information for product signature vector determination to illustrate operation of the software product development defect and issue prediction and diagnosis system of FIG. 1, according to an example of the present disclosure.

FIG. 5 illustrates product state information for product signature vector determination to illustrate operation of the system 100, according to an example of the present disclosure.

Referring to FIGS. 1 and 5, as disclosed herein, the product state analyzer 124 may ascertain product state information 126 on a status of temporal development for the product 108. According to examples, the product state analyzer 124 may ascertain product state information on the status of temporal development for the product 108 by analyzing success and failure activities associated with the temporal development for the product 108 by the plurality of workers 106. For example, for the product 108 that includes a software application, with respect to worker $W_1$, worker $W_2$, and worker $W_3$ for the example of FIGS. 3 and 4, the success and failure activities associated with the temporal development for the software application are illustrated at 500. Further, the success and failure activities may be ascertained from different tools such JIRA, GIT, CONFLUENCE, JENKINS, etc., as shown at 502.

Figure 6:
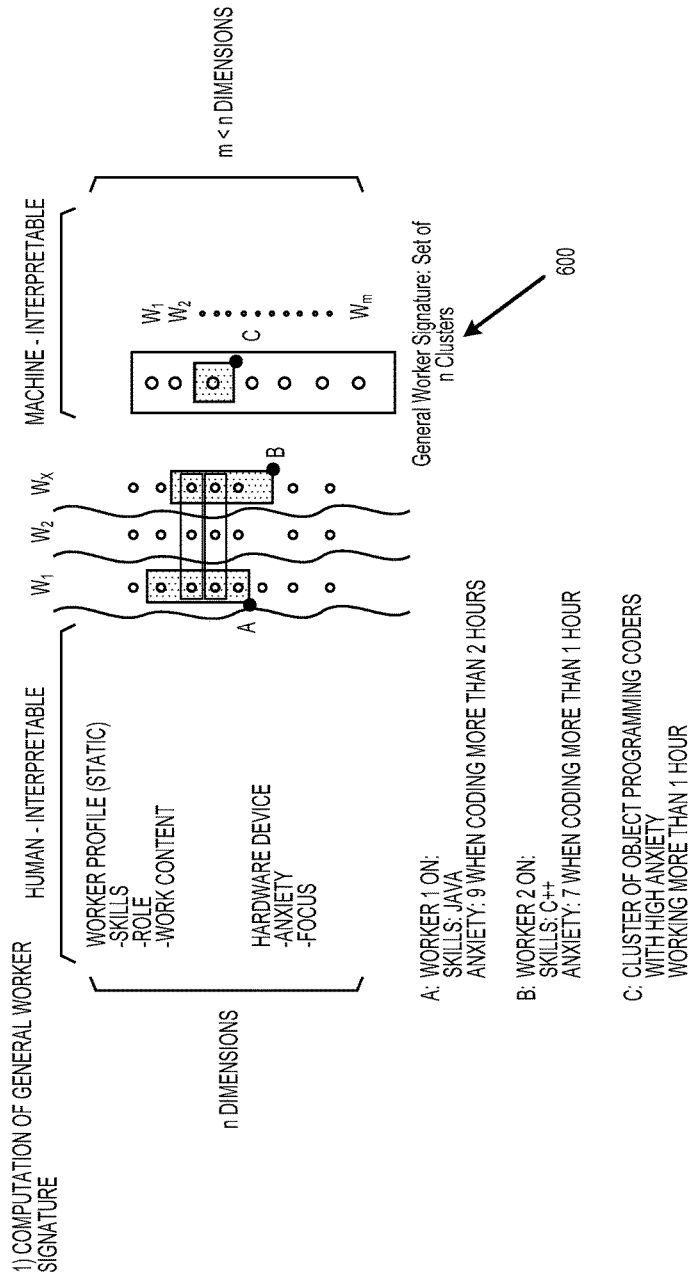
FIG. 6 illustrates general worker signature determination to illustrate operation of the software product development defect and issue prediction and diagnosis system of FIG. 1, according to an example of the present disclosure.

FIG. 6 illustrates general worker signature determination to illustrate operation of the system 100, according to an example of the present disclosure.

Referring to FIGS. 1 and 6, as disclosed herein, the worker signature vector generator 116 may generate, based on the worker profile information 104 and the worker state information 114, the general worker signature 118 (e.g., at 600) that includes the plurality of clusters 120 for all of the plurality of workers 106. Further, the worker signature vector generator 116 may analyze, based on the worker profile information 104 and the worker state information 114, characteristics of each of the plurality of workers 106, determine similarities between the analyzed characteristics, and cluster workers of the plurality of workers 106 based on the determined similarities between the analyzed characteristics to generate the plurality of clusters 120. For example, with respect to worker $W_1$, worker $W_2$, and worker $W_3$ for the example of FIGS. 3-5, at location "A", worker $W_1$ may be assigned an anxiety level of "9" when coding more than two hours, at location "B", worker $W_2$ may be assigned an anxiety level of "7" when coding more than one hour, and thus, the cluster at "C" may represent a cluster of object programming coders with high anxiety when working more than one hour. In this regard, the characteristics for the worker $W_1$ and the worker $W_2$ may include anxiety level, and the determined similarity may include a specified anxiety level (e.g., greater than "7") when coding, for example, more than one hour. In this manner, the cluster at "C" may represent one of the plurality of clusters 120 for all of the workers (e.g., worker $W_1$ to worker $W_m$).

Figure 7:
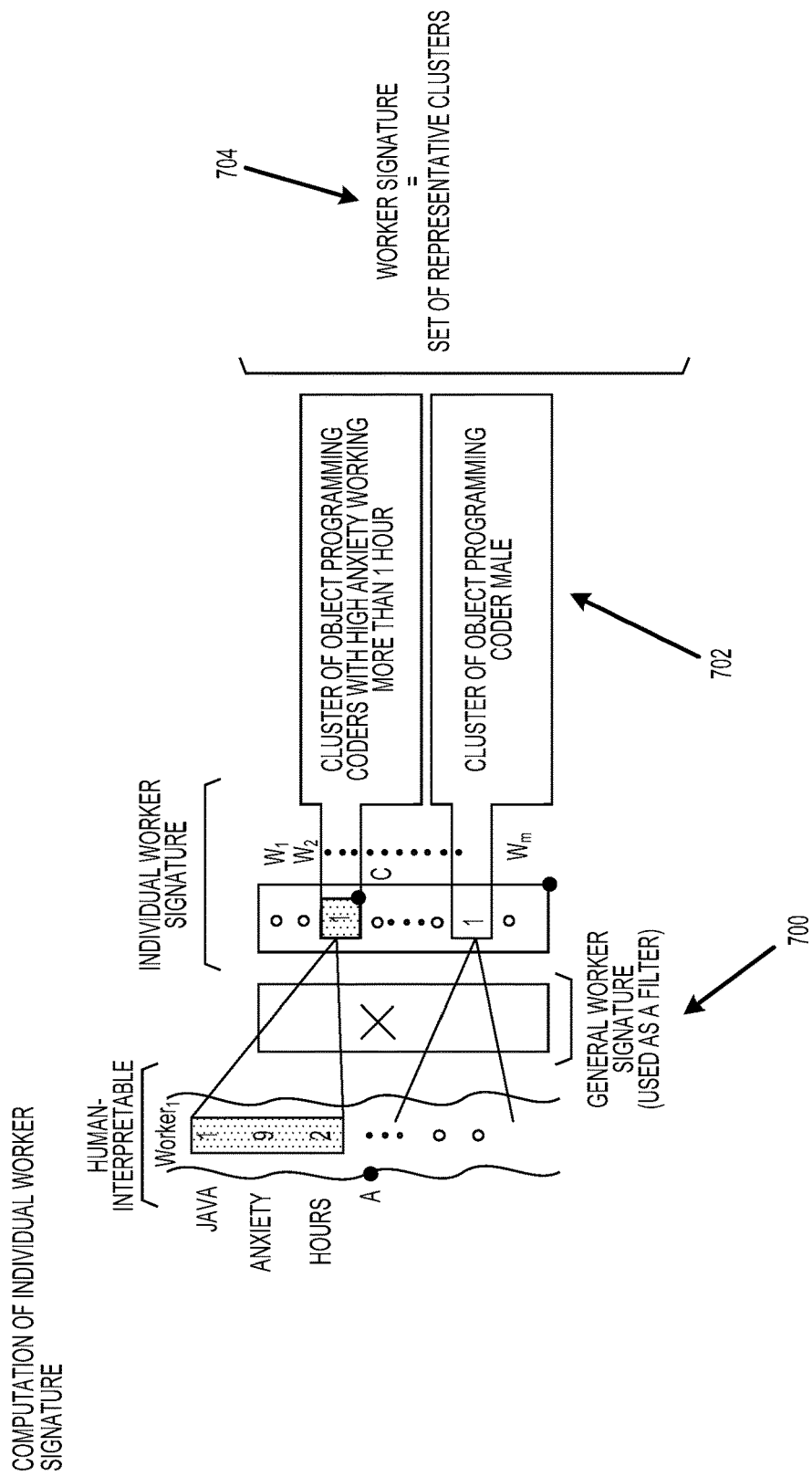
FIG. 7 illustrates individual worker signature vector determination to illustrate operation of the software product development defect and issue prediction and diagnosis system of FIG. 1, according to an example of the present disclosure.

FIG. 7 illustrates individual worker signature vector determination to illustrate operation of the system 100, according to an example of the present disclosure.

Referring to FIGS. 1 and 7, as disclosed herein, for each of the plurality of workers 106, the worker signature vector generator 116 may generate, based on worker profile information for an individual worker, worker state information for the individual worker, and the general worker signature 118, the individual worker signature vector 122 that represents at least one cluster of the plurality of clusters 120 that the individual worker is aligned to. According to examples, the worker signature vector generator 116 may filter the worker profile information for the individual worker and the worker state information for the individual worker, using the general worker signature 118, to identify the at least one cluster of the plurality of clusters 120 that the individual worker is aligned to. For example, with respect to worker $W_1$, worker $W_2$, and worker $W_3$ for the example of FIGS. 3-6, as shown at 700 and 702, the worker signature vector generator 116 may filter the worker profile information for the individual worker and the worker state information for the individual worker, using the general worker signature 118, to identify a first cluster of object programming coders with high anxiety working more than one hour and a second cluster of object programming coder node that the individual worker $W_1$ is aligned to. In this regard, the worker signature vector generator 116 may apply dimensionality reduction to first build m clusters, and then build the worker signature at 704 from the worker's distance from each one of the m clusters. The first cluster may be identified based on the worker profile information for the individual worker and the worker state information for the individual worker that includes JAVA, an anxiety level of one, and a number of hours of two. At 704, dimensions of the reduced worker signature may be interpreted as representing proximity to prototypical cases.

Figure 8:
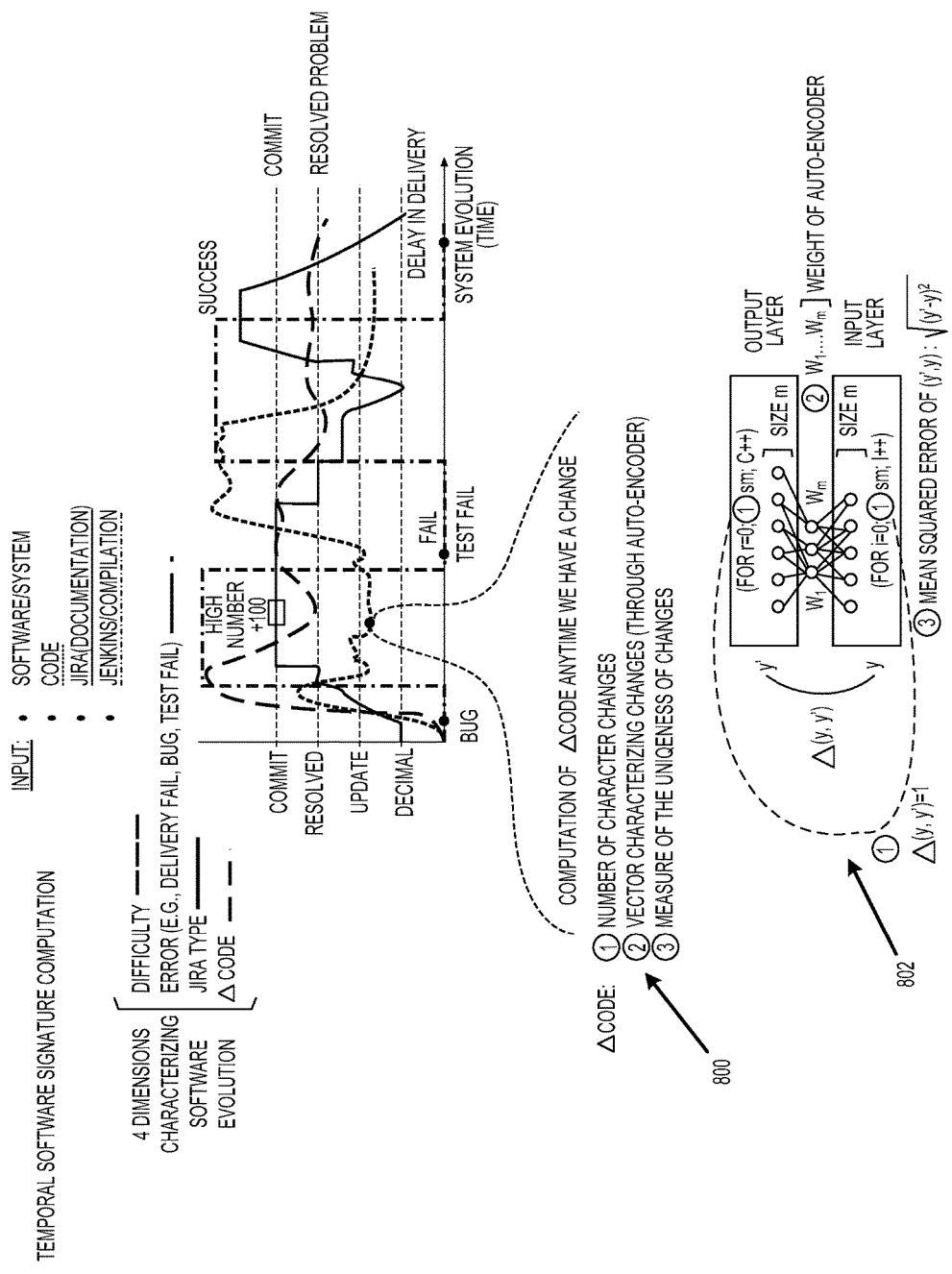
FIG. 8 illustrates product signature vector determination to illustrate operation of the software product development defect and issue prediction and diagnosis system of FIG. 1, according to an example of the present disclosure.

FIG. 8 illustrates product signature vector determination to illustrate operation of the system 100, according to an example of the present disclosure.

Referring to FIGS. 1 and 8, as disclosed herein, the product signature vector generator 128 may generate, based on the product state information 126, the product signature vector 130 that represents changes in the product 108. According to examples, for the product 108 that includes a software application, as shown at 800, the product signature vector generator 128 may establish a signature of the changes to the product 108 by compiling the following: a measure reflecting the absolute extent of the changes made (for example the Levenshtein distance between the original and the changed code), a vector of low dimensionality (relative to the original length of the changes) representing character-level code changes in a lossy manner, and a measure of the uniqueness or atypicality of the code changes observed. As shown at 802, the product signature vector generator 128 may utilize a neural network model to generate the low-dimensional product signature vector 130 that represents the code changes in the software application in a lossy manner. With respect to worker $W_1$, worker $W_2$, and worker $W_3$ for the example of FIGS. 3-7, the neural network may include an autoencoder architecture of arbitrary depth, with y denoting the input layer, and y' denoting the output layer of the neural network model. In this regard, y may refer to a character sequence representing the observed changes to the software code, and y' may represent the same character sequence as approximately reconstructed by the autoencoder. In this regard, (y-y') may represent the reconstruction error, and may be interpreted as a measure of the atypicality or uniqueness of the change sequence. The autoencoder may operate on sequences of characters in order to allow for learning and application across different programming languages utilizing different vocabularies and expressions. The autoencoder may include a discrete or continuous-valued variational layer, in which information about the abstract class of the code (e.g., the language in which it is written) may be captured through a latent discrete or continuous-valued variable.

Figure 9:
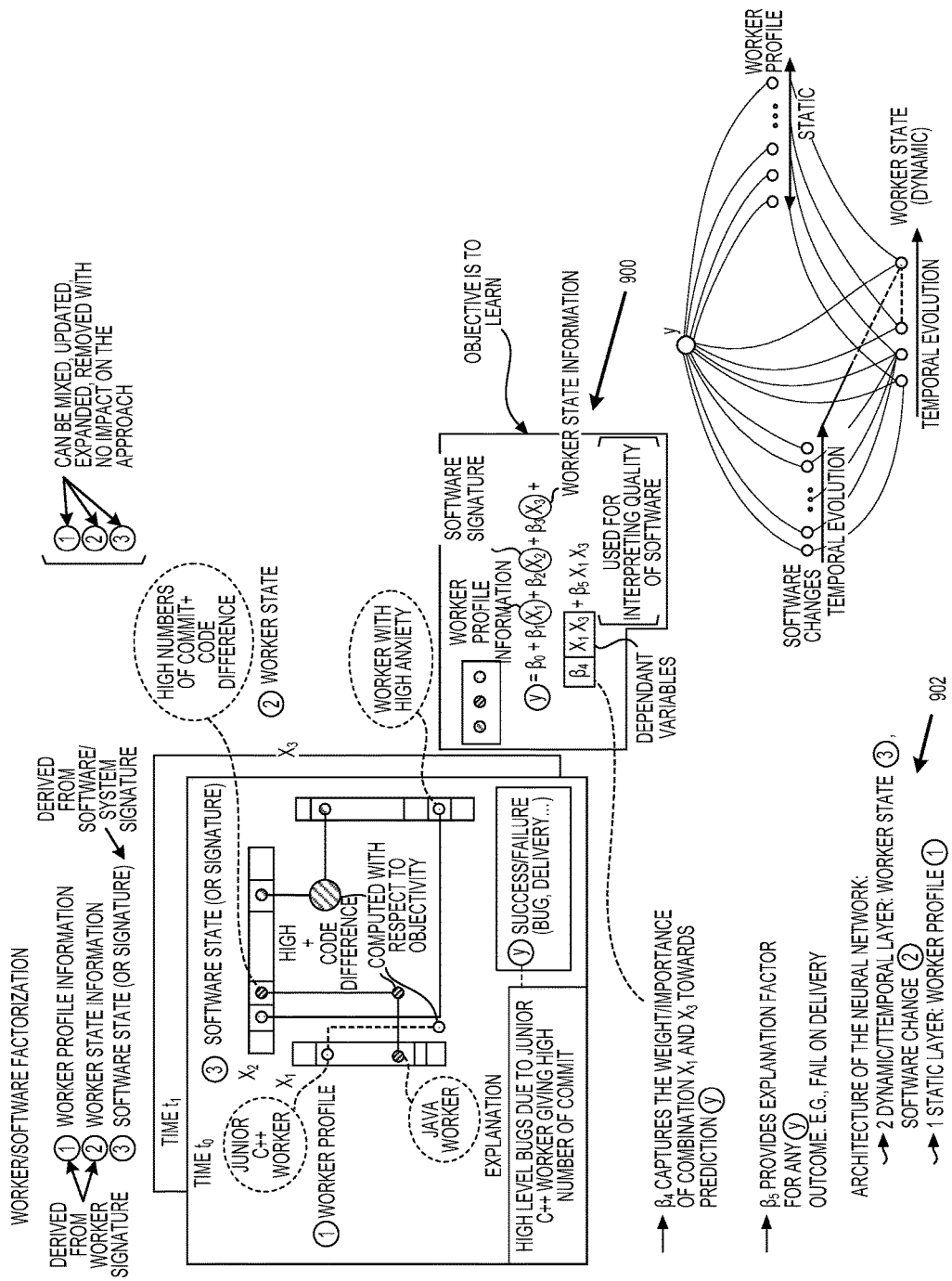
FIG. 9 illustrates user and product factorization to illustrate operation of the software product development defect and issue prediction and diagnosis system of FIG. 1, according to an example of the present disclosure.

FIG. 9 illustrates user and product factorization to illustrate operation of the system 100, according to an example of the present disclosure.

Referring to FIGS. 1 and 9, as disclosed herein, the product development defect analyzer 132 may generate, based on a neural network model receiving as inputs the individual worker signature vectors and the product signature vector 130 over a temporal dimension, the output 134 that reflects the estimated presence of product defects or project issues in the form of an explanation for a defect associated with the development of the product 108. According to examples, as shown at 900, the inputs to the neural network model for defect and issue identification may include individual dimensions of the worker and software signatures as well as appropriate multiplicative combinations (interactions) of pairs of dimensions, where one dimension may be obtained from each of the signatures, to generate the output 134 that includes the explanation for the defect associated with the development of the product 108. For example, with respect to worker $W_1$, worker $W_2$, and worker $W_3$ for the example of FIGS. 3-8, the factors $X_1$ and $X_3$ may respectively represent the worker profile information 104 and the worker state information 114, and may be derived from the general worker signature 118. The factor $X_2$ may represent software state (e.g., the product state information 126) for the product 108 that includes a software application, and may be derived from the product signature vector 130. These factors may be utilized within a linear model equation of the form, for example, $y=\beta_0+\beta_1x_1\beta_2x_2+\beta_3x_3+\beta_4x_1x_3$, where $\beta_2$, for example, captures the weight/importance of $x_2$ towards the estimated outcome y, and $\beta_4$ captures the weight/importance of combination $x_1$ and $x_3$ towards the outcome y. The $\beta_1$ may be the learned coefficients of the model, where each $\beta_1$ corresponds to the effect exerted by the corresponding input variable $x_1$ on the outcome y. Further, as shown at 902, the architecture of the neural network model may include two sequential/temporal layers that include worker state and software change, and a static layer that includes worker profile.

Figure 10:
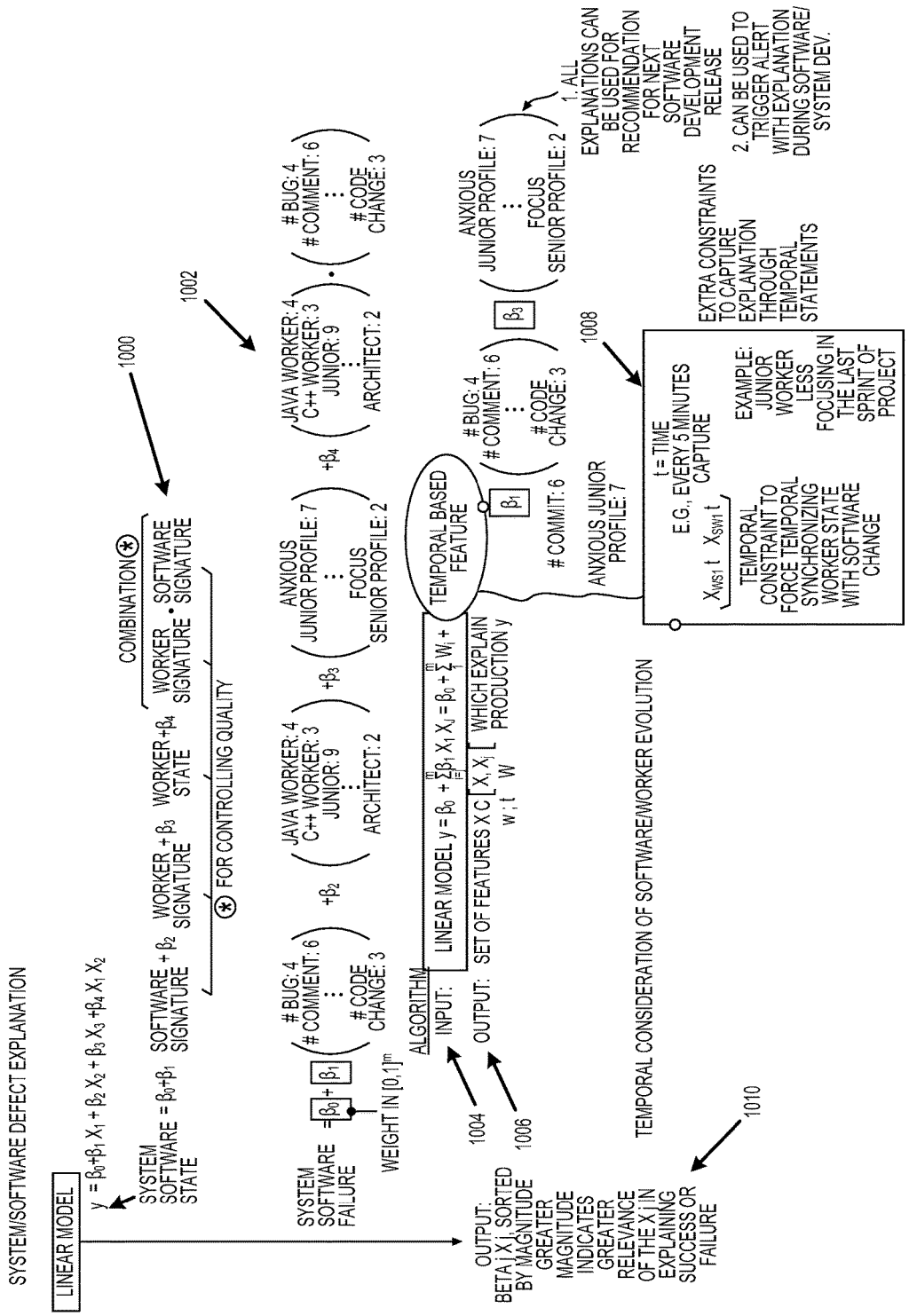
FIG. 10 illustrates product development defect diagnosis to illustrate operation of the software product development defect and issue prediction and diagnosis system of FIG. 1, according to an example of the present disclosure.

FIG. 10 illustrates product development defect diagnosis to illustrate operation of the system 100, according to an example of the present disclosure.

Referring to FIG. 10, as disclosed herein, the product development defect analyzer 132 may determine, for the neural network model based analysis, a product state as a function of the product signature vector 130, the general worker signature 118, and a worker state, to generate the output 134 that includes the explanation for the defect associated with the development of the product 108. In this regard, with respect to worker $W_1$, worker $W_2$, and worker $W_3$ for the example of FIGS. 3-9 and the example of the product 108 that includes a software application, as shown at 1000, for the equation $y=\beta_0+\beta_1x_1+\beta_2x_2+\beta_3x_3+\beta_4x_1x_3$, y may represent the system/software defect prediction output, $x_1$ may represent software signature, $x_2$ may represent worker signature, and $x_3$ may represent worker state. For the example of FIGS. 3-9, examples of values for $x_1$, $x_2$, and $x_3$ are shown at 1002. Based on the input to the neural network model as shown at 1004, the output at 1006 may include a set of features that explain y. For example, an explanation "Junior workers with increased anxiety during the final delivery likely contributed to repeated build failure" may be derived from the relatively high value of the product of the coefficient $\beta_k$ and the value $x_k$, where $x_k$ corresponds to the multiplication (interaction effect) of worker profile and worker state dimensions (i.e., $\beta_k*x_i*x_j$, where $x_i$ is the relevant worker profile dimension and $x_j$ is the relevant worker state dimension). For this worker example, the worker state 'anxious' may be highly associated with the software bugs or delay which may be obtained from the software signature. As shown at 1008, the temporal dimension may be set at five minutes for synchronization of the worker state with the software state. As shown at 1010, the output 134 may be generated by ranking the products $\beta_j*x_i$ by magnitude. In this regard, a greater magnitude may indicate a greater relevance of the $X_j$ for explaining success or failure with respect to the product 108.

Figure 11A:
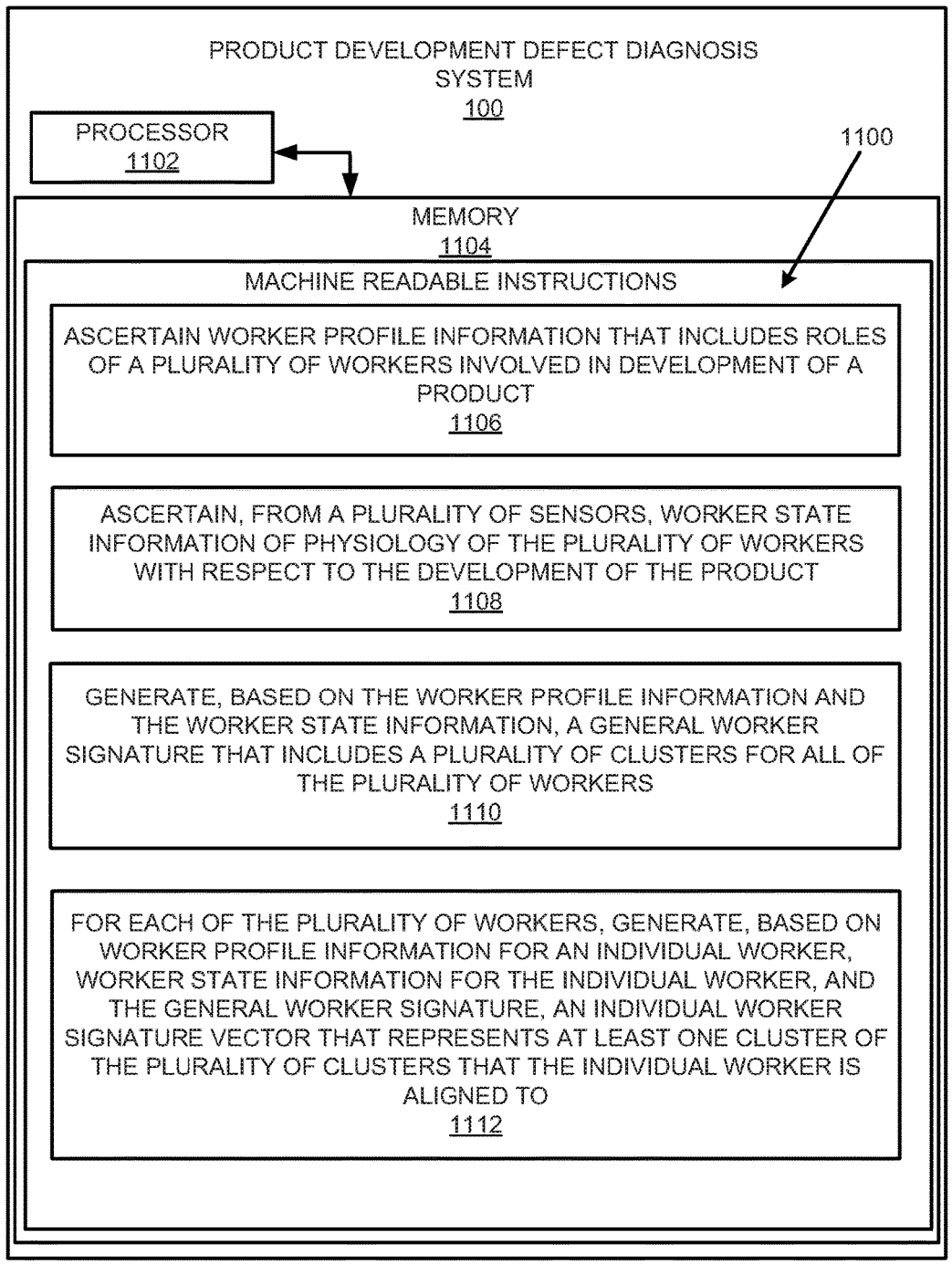
FIGS. 11A and 11B (hereinafter collectively referred to as FIG. 11) illustrate a block diagram for software product development defect and issue prediction and diagnosis, according to an example of the present disclosure.
Figure 11B:
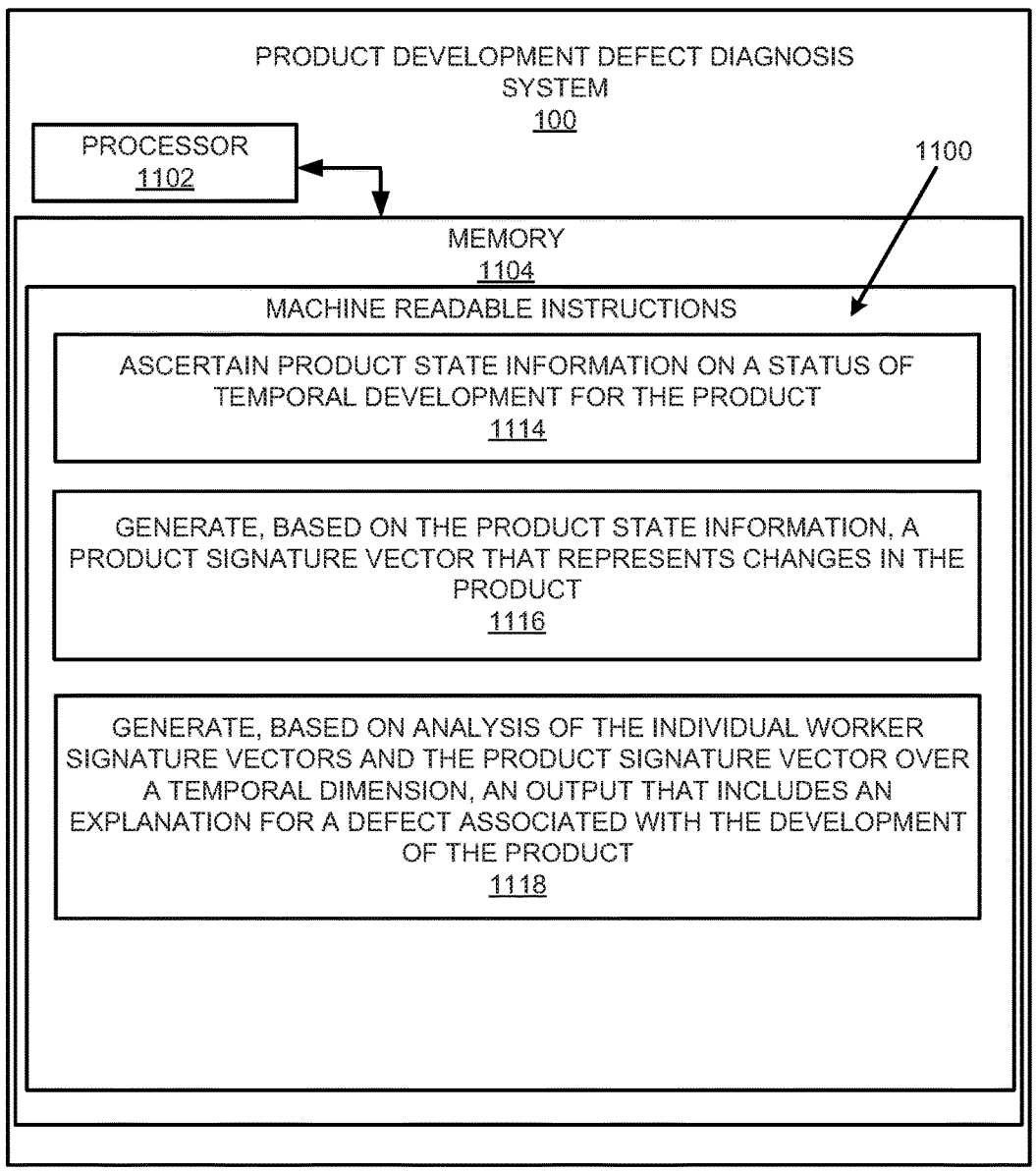
Figure 12:
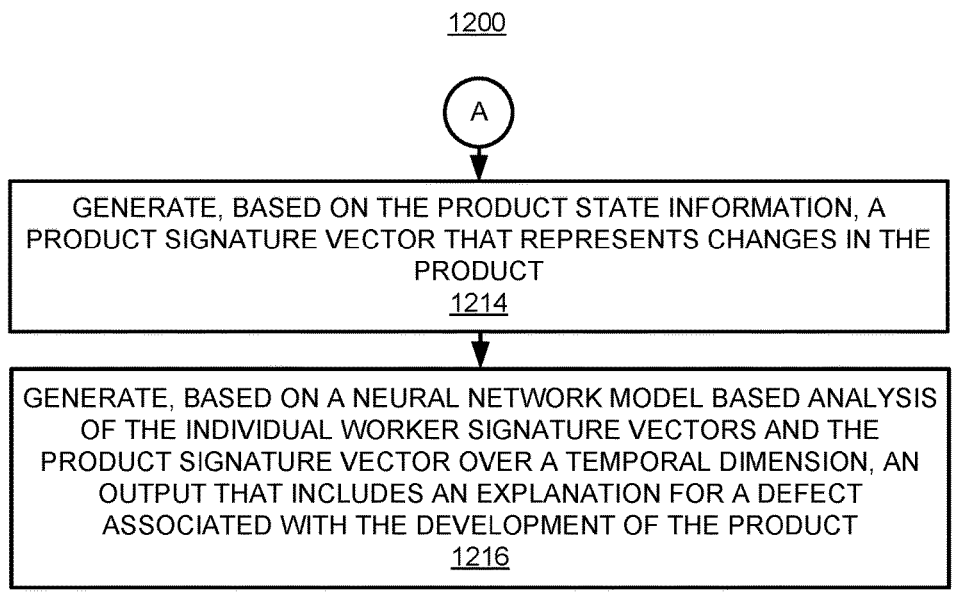
FIG. 12 illustrates a flowchart of a method for software product development defect and issue prediction and diagnosis, according to an example of the present disclosure.
Figure 13A:
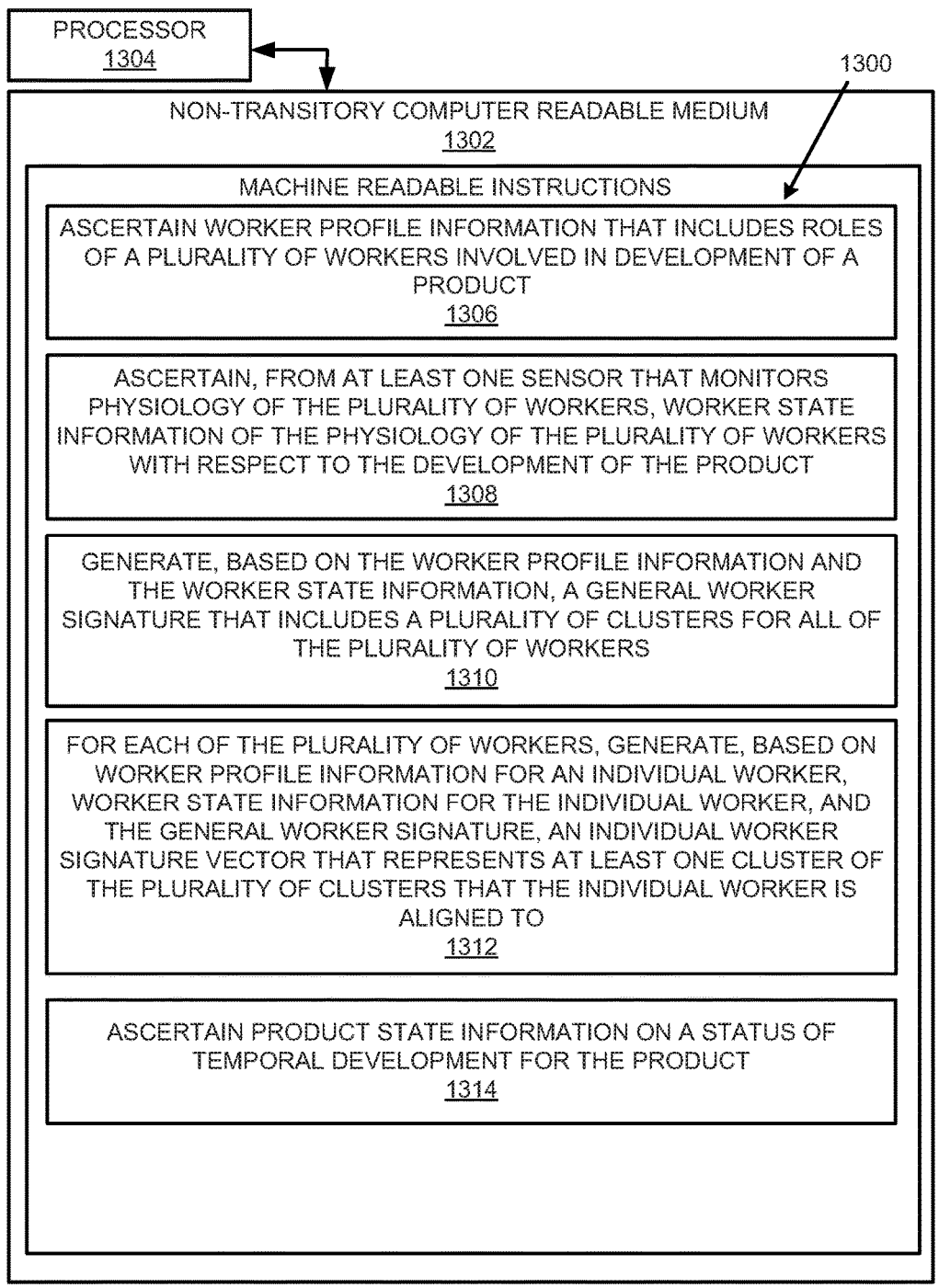
FIGS. 13A and 13B (hereinafter collectively referred to as FIG. 13) illustrate a further block diagram for software product development defect and issue prediction and diagnosis, according to an example of the present disclosure.
Figure 13B:
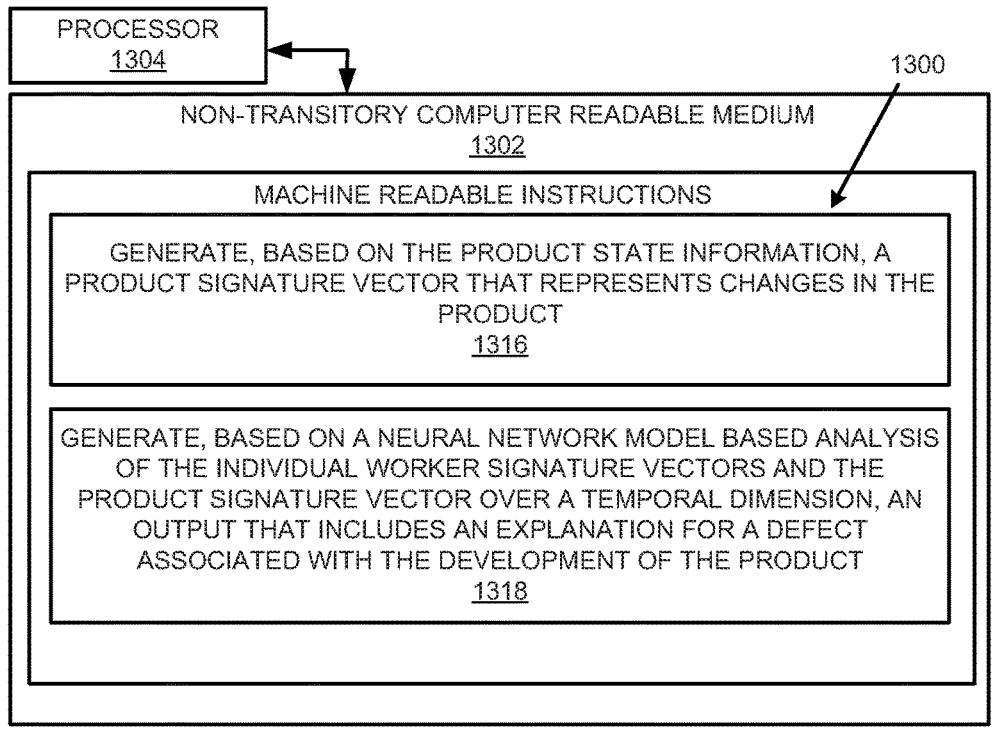

FIGS. 11-13 respectively illustrate a block diagram 1100, a flowchart of a method 1200, and a further block diagram 1300 for software product development defect and issue prediction and diagnosis, according to examples. The block diagram 1100, the method 1200, and the block diagram 1300 may be implemented on the system 100 described above with reference to FIG. 1 by way of example and not limitation. The block diagram 1100, the method 1200, and the block diagram 1300 may be practiced in other systems. In addition to showing the block diagram 1100, FIG. 11 shows hardware of the system 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent a method for software product development defect and issue prediction and diagnosis, and the steps of the method. FIG. 13 may represent a non-transitory computer readable medium 1302 having stored thereon machine readable instructions to provide software product development defect and issue prediction and diagnosis. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to ascertain (e.g., by the worker profile analyzer 102) worker profile information 104 that includes roles of a plurality of workers 106 involved in development of a product 108.

The processor 1102 may fetch, decode, and execute the instructions 1108 to ascertain (e.g., by the worker state analyzer 110), from a plurality of sensors 112, worker state information 114 of physiology of the plurality of workers 106 with respect to the development of the product 108.

The processor 1102 may fetch, decode, and execute the instructions 1110 to generate (e.g., by the worker signature vector generator 116), based on the worker profile information 104 and the worker state information 114, a general worker signature 118 that includes a plurality of clusters 120 for all of the plurality of workers 106.

For each of the plurality of workers, the processor 1102 may fetch, decode, and execute the instructions 1112 to generate (e.g., by the worker signature vector generator 116), based on worker profile information 104 for an individual worker, worker state information for the individual worker, and the general worker signature 118, an individual worker signature vector 122 that represents at least one cluster of the plurality of clusters 120 that the individual worker is aligned to.

The processor 1102 may fetch, decode, and execute the instructions 1114 to ascertain (e.g., by the product state analyzer 124) product state information 126 on a status of temporal development for the product;

The processor 1102 may fetch, decode, and execute the instructions 1116 to generate (e.g., by the product signature vector generator 128), based on the product state information 126, a product signature vector 130 that represents changes in the product 108.

The processor 1102 may fetch, decode, and execute the instructions 1118 to generate (e.g., by the product development defect analyzer 132), based on analysis of the individual worker signature vectors and the product signature vector 130 over a temporal dimension, an output 134 that includes an explanation for a defect associated with the development of the product 108.

Referring to FIGS. 1-10 and 12, and particularly FIG. 12, for the method 1200, at block 1202, the method may include ascertaining worker profile information 104 that includes roles of a plurality of workers 106 involved in development of a product 108.

At block 1204, the method may include implementing at least one sensor to monitor physiology of the plurality of workers 106.

At block 1206, the method may include ascertaining, from the at least one sensor, worker state information 114 of the physiology of the plurality of workers 106 with respect to the development of the product 108.

At block 1208, the method may include generating, based on the worker profile information 104 and the worker state information 114, a general worker signature 118 that includes a plurality of clusters 120 for all of the plurality of workers 106.

At block 1210, for each of the plurality of workers 106, the method may include generating, based on worker profile information for an individual worker, worker state information for the individual worker, and the general worker signature 118, an individual worker signature vector that represents at least one cluster of the plurality of clusters 120 that the individual worker is aligned to.

At block 1212, the method may include ascertaining product state information 126 on a status of temporal development for the product 108.

At block 1214, the method may include generating, based on the product state information 126, a product signature vector 130 that represents changes in the product 108.

At block 1216, the method may include generating, based on a neural network model based analysis of the individual worker signature vectors and the product signature vector 130 over a temporal dimension, an output 134 that includes an explanation for a defect associated with the development of the product 108.

Referring to FIGS. 1-10 and 13, and particularly FIG. 13, for the block diagram 1300, the non-transitory computer readable medium 1302 may include instructions 1306 to ascertain worker profile information 104 that includes roles of a plurality of workers 106 involved in development of a product 108.

The processor 1304 may fetch, decode, and execute the instructions 1308 to ascertain, from at least one sensor that monitors physiology of the plurality of workers 106, worker state information 114 of the physiology of the plurality of workers 106 with respect to the development of the product 108.

The processor 1304 may fetch, decode, and execute the instructions 1310 to generate, based on the worker profile information 104 and the worker state information 114, a general worker signature 118 that includes a plurality of clusters 120 for all of the plurality of workers 106.

For each of the plurality of workers, the processor 1304 may fetch, decode, and execute the instructions 1312 to generate, based on worker profile information for an individual worker, worker state information for the individual worker, and the general worker signature 118, an individual worker signature vector that represents at least one cluster of the plurality of clusters 120 that the individual worker is aligned to.

The processor 1304 may fetch, decode, and execute the instructions 1314 to ascertain product state information 126 on a status of temporal development for the product 108.

The processor 1304 may fetch, decode, and execute the instructions 1316 to generate, based on the product state information 126, a product signature vector 130 that represents changes in the product 108.

The processor 1304 may fetch, decode, and execute the instructions 1318 to generate, based on a neural network model based analysis of the individual worker signature vectors and the product signature vector 130 over a temporal dimension, an output 134 that includes an explanation for a defect associated with the development of the product 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A software product development defect and issue prediction and diagnosis system comprising:
   a worker profile analyzer, executed by at least one hardware processor, to ascertain worker profile information that includes roles of a plurality of workers involved in development of a product;
   a plurality of hardware sensors to sense worker state information of physiology of the plurality of workers;
   a worker state analyzer, executed by the at least one hardware processor, to ascertain, from the plurality of hardware sensors, the worker state information of physiology of the plurality of workers with respect to the development of the product;

a worker signature vector generator, executed by the at least one hardware processor, to generate, based on the worker profile information and the worker state information, a general worker signature that includes a plurality of clusters for all of the plurality of workers, and for each of the plurality of workers, generate, based on worker profile information for an individual worker, worker state information for the individual worker, and the general worker signature, an individual worker signature vector that represents at least one cluster of the plurality of clusters that the individual worker is aligned to;

a product state analyzer, executed by the at least one hardware processor, to ascertain product state information on a status of temporal development for the product;

a product signature vector generator, executed by the at least one hardware processor, to generate, based on the product state information, a product signature vector that represents changes in the product; and a product development defect analyzer, executed by the at least one hardware processor, to generate, based on analysis of the individual worker signature vectors and the product signature vector over a temporal dimension, an output that includes an explanation for a defect associated with the development of the product.

2. The system according to claim 1, wherein the product includes a software application.

3. The system according to claim 2, wherein the worker profile information includes static information that includes the roles of the plurality of workers in association with the development of the software application, skill levels of the plurality of workers with respect to languages usable for the development of the software application, and strength levels of the plurality of workers in association with the development of the software application, and dynamic information that includes prior software applications utilized by the plurality of workers.

4. The system according to claim 1, wherein the plurality of sensors include at least two of an anxiety sensor to measure an anxiety level of each of the plurality of workers during the development of the product, a tracking sensor to measure a focus level of each of the plurality of workers during the development of the product, or a presence sensor to measure a working level of each of the plurality of workers during the development of the product.

5. The system according to claim 1, wherein the product state analyzer is to ascertain product state information on the status of temporal development for the product by:

analyzing success and failure activities associated with the temporal development for the product by the plurality of workers.

6. The system according to claim 1, wherein the worker signature vector generator is to generate, based on the worker profile information and the worker state information, the general worker signature that includes the plurality of clusters for all of the plurality of workers by:

analyzing, based on the worker profile information and the worker state information, characteristics of each of the plurality of workers;

determining similarities between the analyzed characteristics; and clustering workers of the plurality of workers based on the determined similarities between the analyzed characteristics to generate the plurality of clusters.

7. The system according to claim 1, wherein, for each of the plurality of workers, the worker signature vector generator is to generate, based on the worker profile information for the individual worker, the worker state information for the individual worker, and the general worker signature, the individual worker signature vector that represents the at least one cluster of the plurality of clusters that the individual worker is aligned to by:

filtering the worker profile information for the individual worker and the worker state information for the individual worker, using the general worker signature, to identify the at least one cluster of the plurality of clusters that the individual worker is aligned to.

8. The system according to claim 2, wherein the product signature vector generator is to generate, based on the product state information, the product signature vector that represents changes in the software application by:

analyzing, based on a number of character changes in code of the software application and a measure of uniqueness of a change in the code of the software application, the changes in the code of the software application; and utilizing a neural network model to generate the product signature vector that represents the changes in the software application.

9. The system according to claim 1, wherein the product development defect analyzer is to generate, based on the analysis of the individual worker signature vectors and the product signature vector over the temporal dimension, the output that includes the explanation for the defect associated with the development of the product by:

generating, based on a neural network model based analysis of the individual worker signature vectors and the product signature vector over the temporal dimension, the output that includes the explanation for the defect associated with the development of the product.

10. The system according to claim 9, wherein the product development defect analyzer is to generate, based on the neural network model based analysis of the individual worker signature vectors and the product signature vector over the temporal dimension, the output that includes the explanation for the defect associated with the development of the product by:

performing, for the neural network model based analysis, a separate and a combination analysis of factors derived from the general worker signature to generate the output that includes the explanation for the defect associated with the development of the product.

11. The system according to claim 9, wherein the product development defect analyzer is to generate, based on the neural network model based analysis of the individual worker signature vectors and the product signature vector over the temporal dimension, the output that includes the explanation for the defect associated with the development of the product by:

determining, for the neural network model based analysis, a product state as a function of the product signature vector, the general worker signature, and a worker state, to generate the output that includes the explanation for the defect associated with the development of the product.

12. A computer implemented method for software product development defect and issue prediction and diagnosis, the method comprising:

ascertaining worker profile information that includes roles of a plurality of workers involved in development of a product;

implementing at least one sensor to monitor physiology of the plurality of workers;

ascertaining, from the at least one sensor, worker state information of the physiology of the plurality of workers with respect to the development of the product;

generating, based on the worker profile information and the worker state information, a general worker signature that includes a plurality of clusters for all of the plurality of workers;

for each of the plurality of workers, generating, based on worker profile information for an individual worker, worker state information for the individual worker, and the general worker signature, an individual worker signature vector that represents at least one cluster of the plurality of clusters that the individual worker is aligned to;

ascertaining product state information on a status of temporal development for the product;

generating, based on the product state information, a product signature vector that represents changes in the product; and generating, based on a neural network model based analysis of the individual worker signature vectors and the product signature vector over a temporal dimension, an output that includes an explanation for a defect associated with the development of the product.

13. The method according to claim 12, wherein the product includes a software application.

14. The method according to claim 12, wherein the at least one sensor includes an anxiety sensor to measure an anxiety level of each of the plurality of workers during the development of the product, a tracking sensor to measure a focus level of each of the plurality of workers during the development of the product, or a presence sensor to measure a working level of each of the plurality of workers during the development of the product.

15. The method according to claim 12, wherein ascertaining product state information on the status of temporal development for the product further comprises:

analyzing success and failure activities associated with the temporal development for the product by the plurality of workers.

16. A non-transitory computer readable medium having stored thereon machine readable instructions for software product development defect and issue prediction and diagnosis, the machine readable instructions, when executed, cause at least one hardware processor to:

ascertain worker profile information that includes roles of a plurality of workers involved in development of a product;

invoke at least one sensor to monitor physiology of the plurality of workers;

ascertain, from the at least one sensor that monitors physiology of the plurality of workers, worker state information of the physiology of the plurality of workers with respect to the development of the product;

generate, based on the worker profile information and the worker state information, a general worker signature that includes a plurality of clusters for all of the plurality of workers;

for each of the plurality of workers, generate, based on worker profile information for an individual worker, worker state information for the individual worker, and the general worker signature, an individual worker signature vector that represents at least one cluster of the plurality of clusters that the individual worker is aligned to;

ascertain product state information on a status of temporal development for the product;

generate, based on the product state information, a product signature vector that represents changes in the product; and generate, based on a neural network model based analysis of the individual worker signature vectors and the product signature vector over a temporal dimension, an output that includes an explanation for a defect associated with the development of the product.

17. The non-transitory computer readable medium according to claim 16, wherein the machine readable instructions to generate, based on the worker profile information and the worker state information, the general worker signature that includes the plurality of clusters for all of the plurality of workers, when executed by the at least one hardware processor, further cause the at least one hardware processor to:

analyze, based on the worker profile information and the worker state information, characteristics of each of the plurality of workers;

determine similarities between the analyzed characteristics; and cluster workers of the plurality of workers based on the determined similarities between the analyzed characteristics to generate the plurality of clusters.

18. The non-transitory computer readable medium according to claim 16, wherein, for each of the plurality of workers, the machine readable instructions to generate, based on the worker profile information for the individual worker, the worker state information for the individual worker, and the general worker signature, the individual worker signature vector that represents the at least one cluster of the plurality of clusters that the individual worker is aligned to, when executed by the at least one hardware processor, further cause the at least one hardware processor to:

filter the worker profile information for the individual worker and the worker state information for the individual worker, using the general worker signature, to identify the at least one cluster of the plurality of clusters that the individual worker is aligned to.

19. The non-transitory computer readable medium according to claim 17, wherein the machine readable instructions to generate, based on the product state information, the product signature vector that represents changes in the software application, when executed by the at least one hardware processor, further cause the at least one hardware processor to:

analyze, based on a number of character changes in code of the software application and a measure of uniqueness of a change in the code of the software application, the changes in the code of the software application; and utilize a neural network model to generate the product signature vector that represents the changes in the software application.

20. The non-transitory computer readable medium according to claim 16, wherein the machine readable instructions to generate, based on the neural network model based analysis of the individual worker signature vectors and the product signature vector, the output that includes the explanation for the defect associated with the development of the product, when executed by the at least one hardware processor, further cause the at least one hardware processor to:
   determine, for the neural network model based analysis, a product state as a function of the product signature vector, the general worker signature, and a worker state, to generate the output that includes the explanation for the defect associated with the development of the product.

* * * * *